Jan. 28, 1964
K. RITTER
3,119,478
VEHICLE TRANSMISSIONS
Filed Aug. 29, 1961
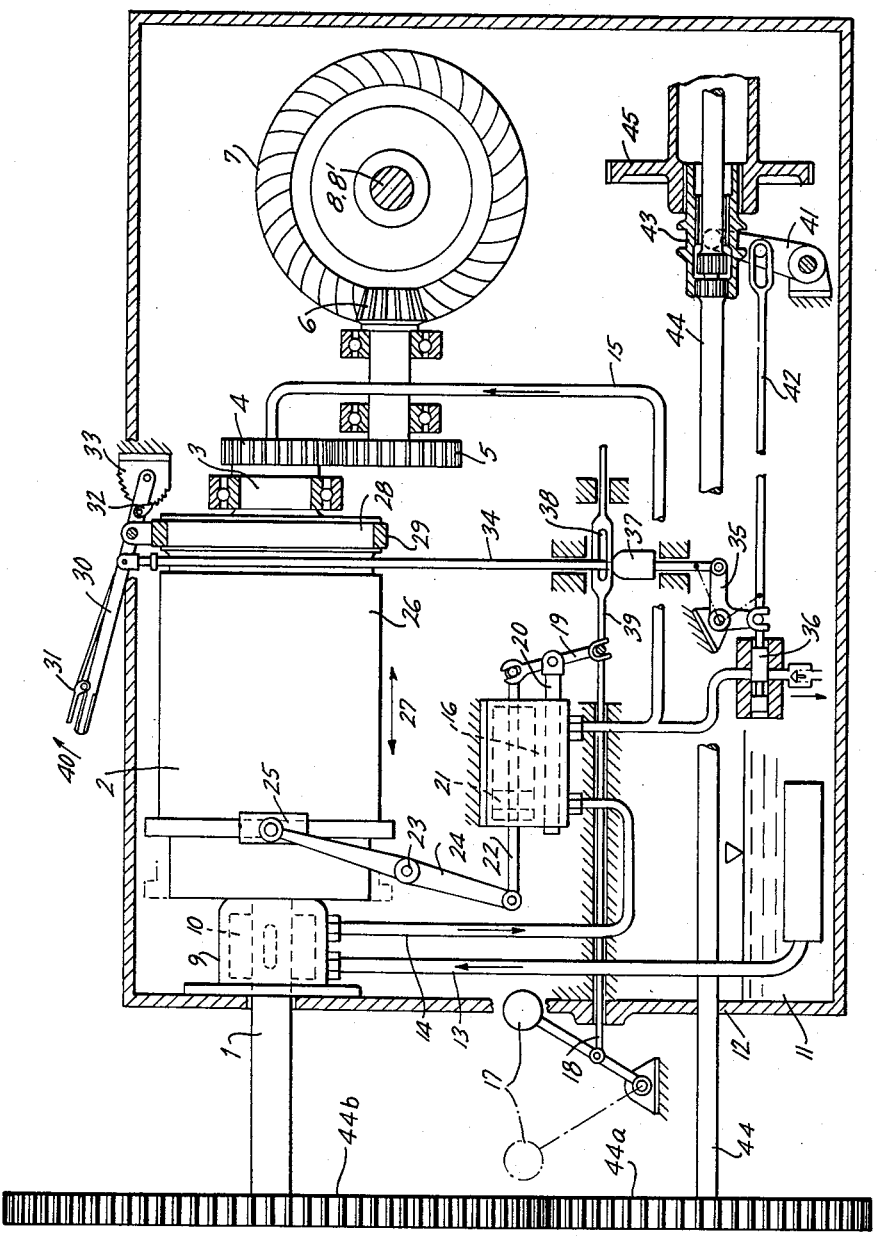
INVENTOR.
Kaspar Ritter
BY
Michael S. Striker
Attorney

United States Patent Office 3,119,478
Patented Jan. 28, 1964

3,119,478
VEHICLE TRANSMISSIONS
Kaspar Ritter, Kirchheim (Teck), Germany, assignor to
Allgaier-Werke G.m.b.H., Uhingen, Wurttemberg,
Germany
Filed Aug. 29, 1961, Ser. No. 134,646
Claims priority, application Germany Sept. 9, 1960
9 Claims. (Cl. 192—4)

The present invention relates to vehicle transmissions. More particularly, the present invention relates to vehicle transmissions wherein the drive is transmitted from the engine to the propelling axle or axles of the vehicle through a torque converter such as a hydraulic or hydrostatic torque converter. With transmissions of this type it is highly desirable to lock the output which is driven by the torque converter against movement when the manual speed-controlling structure has been placed by the operator in its neutral position. Thus, the torque converter drives a rotary output which in turn drives the propelling axle or axles of the vehicle through a suitable step-down transmission. Of course, when the speed control has been placed in its neutral position by the operator, but the torque converter does not reach exactly the transmission ratio one to infinite between the rotary input and output shaft, the latter will continue to turn for an indefinitely long time very slowly if no means are provided for positively preventing operation of the rotary output shaft. Therefore, devices are provided for releasably holding the output shaft of the torque converter against rotation when the speed control has been placed in its neutral position. These known devices have serious drawbacks, however, in that they generally take the form of a pawl and ratchet arrangement which only assumes a position of readiness when the speed control is placed in its neutral position and which then automatically move into the locking position when the speed of rotation of the output of the torque converter falls below a given value. Thus, with these known devices it is unavoidable that there will be a certain undesirable delay in the stopping of the rotation of the output of the torque converter as well as a substantial undesirable shock resulting from the sudden stopping of the rotation of the output shaft when the ratchet mechanism or the like becomes engaged.

It is accordingly a primary object of the present invention to provide a structure which will overcome the above drawbacks by stopping the rotation of the output shaft very quickly and at the same time gradually so that the above-mentioned delay and shock are reliably avoided.

A further object of the present invention is to provide a structure which will not only quickly and gradually stop the movement of the output of the torque converter, but which will also guarantee that when the output shaft is prevented from rotating the speed control is necessarily in its neutral position.

A further object of the present invention is to provide a structure which, in addition to quickly and gradually stopping the transmission of the output of the torque converter, will also place a valve which controls the pressure of the fluid of the torque converter in a low pressure position so that when the output transmission is terminated the hydraulic torque converter will also necessarily have a reduction in the pressure of the fluid therein.

It is furthermore an object of the present invention to provide a structure which, in addition to quickly and gradually stopping the operation of the output transmission of the torque converter, will also automatically place in a disengaged position a clutch which forms part of a transmission which bypasses the torque converter to transmit a drive from the engine directly to a power take-off shaft or the like, in the case where the vehicle is a tractor, for example, so that disengagement of this clutch when the output from the torque converter is terminated is guaranteed.

It is also an object of the present invention to provide a structure capable of accomplishing all of the above objects and at the same time composed of simple rugged elements which are very reliable in operation.

With the above objects in view the invention includes, in a vehicle, a hydraulic torque converter adapted to be driven by an engine of the vehicle and a rotary output means driven by the torque converter. A brake means cooperates with the rotary output means for stopping the movement thereof when said brake means is engaged, and this brake means of the invention is manually operable and includes a manually movable member for actuating the brake means. A conduit communicates with the hydraulic torque converter, and a valve means communicates with this conduit and has high and low pressure positions for maintaining the fluid in the torque converter at high and low pressures, respectively, and in accordance with the present invention a motion-transmitting means cooperates with the valve means and with the manually movable member of the brake means for placing the valve means in its low pressure position when the manually movable member is moved by the operator to engage the brake means and for placing the valve means in its high pressure position when the brake means is disengaged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The drawing shows in a partly schematic manner one possible structure according to the present invention.

The transmission which is illustrated in the drawing is particularly adapted for use with a tractor. The drawing fragmentarily illustrates a shaft 1 which is driven directly from the unillustrated engine of the vehicle. Thus, the shaft 1 is connected in a known way to the crankshaft of the engine to rotate with the crankshaft. The shaft 1 is operatively connected to a conventional hydraulic torque converter 2 so as to drive the latter with the energy derived from the engine. A rotary output means 3 is driven by the torque converter except, of course, when the torque converter is placed in a neutral position, as described below. The rotary output means 3 is in the form of a rotary shaft driven in a known way by the hydraulic torque converter and supported by any suitable bearing structure, as shown in the drawing. The drawing illustrates diagrammatically an axle means 8, 8' which, when driven, propels the vehicle, the axle means being connected, for example, to the rear wheels of the vehicle, and as is shown in the drawing, this axle means is driven from the rotary output means 3 through a step-down transmission which includes a first step-down stage formed by the gears 4 and 5 and a second step-down stage formed by the gears 6 and 7. Thus, the gear 4 is connected directly to the rotary output means 3 to rotate therewith, while the gear 5 which meshes with the gear 4 is fixed coaxially with the bevel gear 6 which in turn meshes with the bevel gear 7, and of course there is a conventional differential between the gear 7 and the axle means 8, 8', this differential being omitted from the drawing for the sake of clarity. The rotary output 3 as well as the gear 4 are formed with axial bores through which a hydraulic conduit 15 communicates with the interior of the hydraulic torque converter for a purpose described below.

The shaft 1 also drives a make-up pump 9, 10 which sucks a fluid such as oil from the sump 11 in the lower part of the housing 12 in which the torque converter and additional elements are located, as shown diagrammatically in the drawing. The fluid is sucked from the sump 11 into the pump through the intake conduit 13, and the make-up pump 9, 10 delivers this fluid under pressure to the pressure conduit 14 which communicates through a conventional servo mechanism 16 with the pressure conduit 15, so that after leaving the servo mechanism the hydraulic fluid provided by the pump 9, 10 flows through the conduit 15 into the torque converter to replace fluid lost by leakage, for example. The torque converter 2 is of a well known type having a closed hydraulic circuit, but it is necessary to provide, as is well known, a make-up pump communicating with the torque converter to compensate for leakage losses.

The servo mechanism 16 serves to regulate the torque converter and forms part of a speed-control means. This speed-control means includes a manually movable member in the form of a lever 17 accessible to the operator for regulating the torque converter. This lever 17 is turnable, for example, between the solid and dot-dash line positions indicated in the drawing so as to change the speed from a maximum forward speed to a maximum rearward speed, and in moving between its extreme positions the lever 17 will pass through a neutral position where the lever 17 extends vertically, for example, and where the torque converter 2, although still operating, will not transmit a drive to the rotary output means 3, as is well known. The speed-control means includes, in addition to the servo mechanism 16 and the manually movable member 17, an elongated rod 18 supported for longitudinal movement by any suitable bearing structure and pivotally connected at one end to the lever 17. This rod 18 is connected through a pin-and-slot connection, for example, with a two-armed lever 19 which is pivotally connected intermediate its ends to a slide valve 20 which controls the servo mechanism 16 in a well known manner, and this lever 19 is connected at its end distant from the rod 18 also through a pin-and-slot connection, for example, to the piston rod 22 of the driving piston 21 of the servo mechanism 16. This piston rod 22, at its end distant from the lever 19, is pivotally connected to one end of a lever 24 which is pivotally supported intermediate its ends by a stationary pivot 23 in the housing 12, and this lever 24 is also linked to a slide member 25 which remains at all time in slidable engagement with a rotary adjusting member 26 which rotates with the output of the torque converter in a well known manner. While being rotatable with the output of the torque converter, the cylinder 26 is axially shiftable along the torque converter for adjusting in a well known manner the transmission ratio of the torque converter. For example, the torque converter includes a fluid pump and a fluid motor which are in fact identical with each other and which are of the variable-speed multi-piston displacement pump type. These pumps or fluid motors are adjusted in a well known way by varying the angle of inclination of the wobble plates or wobble rings thereof, and the axially shiftable cylinder 26 is connected to these wobble plates or wobble rings to regulate their inclination so as to regulate the transmission ratio of the torque converter. Thus, through the above-described speed control means it is possible by manipulation of the lever 17 to shift the member 26 in either of the directions indicated by the arrow 27 so as to regulate the transmission ratio of the torque converter. By the above-described connection of the piston rod 22 to the lever 19, the control member 20 of the servo mechanism will be given, in a well known manner, a follow-up or restoring movement.

A brake means is operatively connected to rotary output means 3 of the hydraulic torque converter 2, and this brake means includes a brake lining 28 fixedly connected to the rotary output 3 for rotation therewith and a brake band 29 which tightly engages the lining 28 when the brake means is engaged and which extends loosely around the lining 28 when the brake means is disengaged. In order to engage and disengage the brake means, a manually movable member 30 is provided, this member 30 being in the form of a lever which, when turned by the operator in one direction, will, in a well known manner, cause the brake band 29 to grip tightly the brake lining 28 so as to stop the rotation of the rotary output 3 very quickly and at the same time gradually without producing any shocks as would be produced by a pawl and ratchet type of stopping mechanism. The lever 30 is manually turned in an opposite direction to disengage the brake means. The lever 30 is turned in a clockwise direction, as viewed in the drawing, to engage the brake means. This lever 30 is supported for rotary movement at its right end, as viewed in the drawing, and it carries a pawl 32 which cooperates with the teeth at the periphery of a sector 33 to releasably maintain the member 30 in the position to which it is moved by the operator during engagement of the brake means. The member 30 includes a manually operable release means 31, of well known construction, which is actuated by the operator in order to maintain the pawl 32 away from the ratchet 33 so that the brake means may be disengaged. Inasmuch as the brake means cooperates with the rotary output 3 which is connected to the axle means 8, 8' through the step-down transmission 4—7, it is clear that when the brake means is engaged the axle means 8, 8' is held stationary and thus the vehicle is prevented from undesired movement.

A valve means communicates with the conduit 15 through which fluid under pressure is delivered to the torque converter to make up for leakage losses as described above. This valve means is shiftable between high and low pressure positions, and the valve means 36 is shown in the drawing in its high pressure position. At this time the brake means is disengaged. A motion-transmitting means interconnects the manually movable member 30 of the brake means with the valve means for placing the valve means in its high pressure position when the brake means is disengaged and for placing the valve means in its low pressure position when the brake means is engaged. This motion-transmitting means includes the elongated rod 34 which is guided for longitudinal movement as by the bearings diagrammatically shown in the drawing, and which is pivotally connected at one end to the moving member 30 of the brake means and at its opposite end to a bell crank 35 supported for pivotal movement by any stationary pivot, as indicated diagrammatically in the drawing. It should be noted that all pivotal connections shown in the drawing have sufficient play, wherever required, to guarantee that all of the parts can turn freely while longitudinally moving elements such as the rod 34. The arm of the bell crank 35 which is not connected to the rod 34 has a pin-and-slot connection with a rod 42 which is fixed to and extends from the slide valve member of the valve means 36. Thus, when the manually movable member 30 of the brake means is turned in a clockwise direction, as viewed in the drawing, the rod 34 will be shifted upwardly, as viewed in the drawing, and the bell crank 35 will turn in a counterclockwise direction to shift the slide valve member of the valve means 36 to the right, as viewed in the drawing, so that the valve means is now placed in its low pressure position where the fluid can return freely to the sump, a spring-pressed non-return valve being provided only to maintain a certain minimum pressure in the hydraulic fluid which is in the torque converter when the brake means is engaged. Thus, in this way whenever the brake means is engaged and the torque converter is idling the pressure of the fluid in the torque converter is automatically reduced, and of course when the parts are returned to the position shown in the drawing where the brake means is disengaged the fluid pressure in the torque converter is automatically increased since the make-up pump delivers the fluid under pressure to the torque converter without the possibility of this fluid flowing through the valve means 36. Thus, whenever the brake means is engaged the flow of fluid to the torque converter will be automatically interrupted.

The structure of the invention also includes a means which automatically places the torque converter in its neutral idling position whenever the brake means is engaged. For this purpose the rod 18 has an extension 39 formed with an elongated slot 38, and the ends of the slot 38 are adapted to cooperate with the oppositely inclined camming edges of a cam 37 which is fixed to the rod 34 for movement therewith. Thus, when the parts are in the position shown in the drawing and the operator turns the manually movable member 30 in the direction of the arrow 40 to engage the brake means, the left inclined edge of the cam 37 of the drawing will cooperate with the left end of the slot 38 to shift the rod 39 to the left, as viewed in the drawing, so that in this way the servo means 16 is automatically placed in a neutral position where the hydraulic torque converter 2 idles without driving the rotary output means 3, whenever the brake means is engaged. It will be noted that at the same time the rod 18 shifts to the left to automatically place the lever 17 in its neutral position. If the lever 17 is in its dot-dash line position, then the right inclined edge of the cam 37 cooperates with the right end of the slot 38, as viewed in the drawing, to place the transmission in its neutral position as well as to locate the lever 17 in its neutral position. It will be noted that this construction acts also as a safety device since it is impossible for the brake means to be engaged while the transmission is in any position except neutral. Thus, if the brake means should for some reason become accidentally disengaged it is impossible for the transmission to be in a drive position so that the vehicle could start moving unintentionally, and furthermore a jerky starting of the vehicle, such as might occur if the brake means is released while the transmission is in a driving position, is reliably avoided. Of course, instead of the wedge-shaped type of cam 37 cooperating with the slot 38, it is possible to provide other structures such as differently shaped cams and the like to cooperate with different types of cam followers to accomplish the same results.

The rod 42 which is connected to the valve means 36 has a pin-and-slot connection with the manually turnable lever 41 which is turned by the operator, through any suitable unillustrated linkage, for engaging and disengaging a clutch 43. As is well known, it is possible, as shown for example in the U.S. Patent No. 2,945,382, to provide a transmission which bypasses the torque converter to transmit a drive directly from the engine to a power take-off shaft, in the case of a tractor, for example, and such a transmission 44, 45 is shown fragmentarily in the drawing, the shaft 44 being connected through gears 44a, 44b to shaft 1 ahead of the torque converter. The clutch 43 in practice will be a friction clutch which when engaged transmits the drive to the power take-off shaft. The clutch is shown in the drawing in its disengaged position. In order to engage the clutch the lever 41 is turned in a counterclockwise direction so that the pin connected to this lever 41 will be located at the left end of the slot shown at the lower right part of the drawing. Thus, if this clutch should be engaged and the manually movable member 30 is turned in the direction of the arrow 40 to engage the brake means, not only will the valve means 36 be shifted to its low pressure position, but in addition the lever 41 will necessarily be turned to the position shown in the drawing so that with the structure of the invention the clutch means of the bypass transmission is also automatically disengaged whenever the brake means is engaged. As is well known, the bypass transmission may also be connected to the transmission which drives the axle means 8, 8' so that it is possible to drive the vehicle, in the case of a failure of the hydraulic torque converter, directly from the engine, and it is also possible to use vehicle movement to start the engine, when necessary. Thus, any device driven through the transmission 44, 45 will automatically stop operating whenever the brake means is engaged.

It will be noted that because the brake means of the invention cooperates with the rotary output means 3 of the hydraulic torque converter, the brake means itself is very effectively cooled by the fluid of the torque converter, and in addition the brake means acts on the axle means 8, 8' through the step-down transmission 4—7 so that an exceedingly effective braking action is obtained. Moreover, by avoiding a jerky starting of the movement of the vehicle when the brake means is disengaged, because the transmission is necessarily at a neutral position when the brake is engaged, as described above, the shocks and load applied to the parts during such a jerky starting of the vehicle movement are reliably avoided.

It will be understood that each of the elements described above, or two or more together, may also find a useful application in other types of vehicles differing from the types described above.

While the invention has been illustrated and described as embodied in vehicle transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle, in combination, a hydraulic torque converter adapted to be driven by an engine of the vehicle; axle means for propelling the vehicle; output means driven by said torque converter for transmitting the output thereof, said output means being operatively connected to and in permanent driving engagement with said axle means to drive the latter; valve means communicating with said hydraulic torque converter for controlling, at least in part, the flow of hydraulic fluid in said torque converter; manually operable brake means cooperating with said output means for stopping operation thereof when said brake means is engaged and for stopping the drive to said axle means when said brake means is engaged, said manually operable brake means having a manually movable member for operating said brake means; and motion-transmitting means operatively connected to said manually movable member and said valve means for operating said valve means also with said manually movable member.

2. In a vehicle, in combination, a hydraulic torque converter adapted to be driven by an engine of the vehicle; axle means for propelling the vehicle; rotary output means driven by said hydraulic torque converter for transmitting the output thereof, said output means being operatively connected to and in permanent driving engagement with said axle means to drive the latter; a hydraulic conduit communicating with said torque converter; valve means communicating with said conduit and having a high pressure position and a low pressure position for maintaining fluid in the conduit and therefore in the torque converter either at a high pressure or a low pressure, respectively; manually operable brake means cooperating with said rotary output means for stopping the movement thereof when said brake means is engaged so as to stop also the operation of the torque converter and axle means, said brake means including a manually movable member for actuating said brake means and having a disengaged position where said brake means is disengaged and an engaged position where said brake means is engaged; and motion-transmitting means operatively connected to said manually movable member and said valve means for placing said valve means in said low pressure position thereof when said manually movable member is in said engaged position thereof and for placing said valve means in said high pressure position thereof when said manually movable member is in said disengaged position thereof.

3. In a vehicle, in combination, a torque converter adapted to be driven by an engine of the vehicle; axle means for propelling the vehicle; rotary output means driven by said torque converter for transmitting the drive thereof, said output means being operatively connected to and in permanent driving engagement with said axle means to drive the latter; manually operable speed-control means operatively connected to said torque converter for regulating the latter, said operable speed-control means having a neutral position where the torque converter operates without driving said rotary output means; manually operable brake means cooperating with said rotary output means for stopping the operation thereof when said brake means is engaged so as to stop also the operation of said torque converter and axle means, said brake means having a manually movable member for actuating said brake means; and motion-transmitting means cooperating with said manually movable member and said manually operable speed-control means for placing the latter in said neutral position thereof when said manually movable member is actuated to engage said brake means.

4. In a vehicle, in combination, a torque converter adapted to be driven by an engine of the vehicle; rotary output means driven by said torque converter for transmitting the output thereof; brake means cooperating with said rotary output means for stopping the movement thereof when said brake means is engaged, said brake means including a manually movable member for actuating said brake means; transmission means bypassing the torque converter for transmitting a drive from the engine to a power take-off shaft or the like; clutch means operatively connected to said transmission means for connecting the latter to the power take-off shaft when said clutch means is in an engaged position and for disconnecting said transmission means from the power take-off shaft when said clutch is in a disengaged position; and motion-transmitting means operatively connected to said manually movable member and said clutch means for placing said clutch means in said disengaged position when said manually movable member places said brake means in said engaged position thereof.

5. In a vehicle, in combination, a hydraulic torque converter; rotary output means driven by said torque converter; brake means cooperating with said rotary output means for stopping the movement thereof when said brake means is engaged and for freeing said output means for movement when said brake means is disengaged, said brake means including a manually movable member for actuating said brake means and movable between engaged and disengaged positions for placing said brake means respectively in said engaged and disengaged positions thereof; manually operable speed-control means cooperating with said torque converter for controlling the speed thereof, said manually operable speed-control means having a neutral position where said torque converter does not drive said rotary output means; a hydraulic conduit communicating with said hydraulic torque converter; valve means communicating with said conduit and having high pressure and low pressure positions where the fluid of the torque converter is at a relatively high and a relatively low pressure, respectively; and motion-transmitting means operatively connecting said manually movable member of said brake means to said manually operable speed-control means and to said valve means for placing said speed-control means in said neutral position thereof and said valve means in said low pressure position thereof when said manually movable member is in said engaged position thereof, and for releasing said speed-control means for movement from said neutral position thereof and placing said valve means in said high pressure position thereof when said manually movable member is in said disengaged position thereof.

6. In a vehicle, in combination, a hydraulic torque converter; rotary output means driven by said torque converter; brake means cooperating with said rotary output means for stopping the movement thereof when said brake means is engaged and for freeing said output means for movement when said brake means is disengaged, said brake means including a manually movable member for actuating said brake means and movable between engaged and disengaged positions for placing said brake means respectively in said engaged and disengaged positions thereof; manually operable speed-control means cooperating with said torque converter for controlling the speed thereof, said manually operable speed-control means having a neutral position where said torque converter does not drive said rotary output means; a hydraulic conduit communicating with said hydraulic torque converter; valve means communicating with said conduit and having high pressure and low pressure positions where the fluid of the torque converter is at a relatively high and a relatively low pressure, respectively; motion-transmitting means operatively connecting said manually movable member of said brake means to said manually operable speed-control means and to said valve means for placing said speed-control means in said neutral position thereof and said valve means in said low pressure position thereof when said manually movable member is in said engaged position thereof, and for releasing said speed-control means for movement from said neutral position thereof and placing said valve means in said high pressure position thereof when said manually movable member is in said disengaged position thereof; transmission means bypassing the torque converter for transmitting a drive from an engine of the vehicle to a power take-off shaft or the like; and clutch means operatively connected to said transmission means for connecting the latter to the power take-off shaft when the clutch means is engaged and for disconnecting the transmission means from the power take-off shaft when the clutch means is disengaged, said motion-transmitting means also being operatively connected to said clutch means for disengaging the latter when said manually movable member is placed in said engaged position thereof.

7. In a vehicle, in combination, a torque converter adapted to be driven by an engine of the vehicle; axle means for propelling the vehicle; rotary output means driven by said torque converter and operatively connected to said axle means for driving the latter, said output means being in permanent driving engagement with said axle means; brake means cooperating with said rotary output means for stopping the operation thereof when said brake means is engaged and for stopping the drive to said axle means when said brake means is engaged, said brake means having a manually movable member for actuating said brake means; an elongated first rod supported for longitudinal movement and connected to said manually movable member to be moved thereby; manually operable speed-control means operatively connected to said torque converter for regulating the same, said speed-control means also having a manually movable member for actuating the same and having a predetermined neutral position; an elongated second rod guided for longitudinal movement and operatively connected to said manually movable member of said speed-control means to be moved thereby, said elongated second rod having a portion located adjacent said first rod; and cam means carried by said first rod and cooperating with said portion of said second rod for shifting the latter to place said manually movable member of said speed-control means in said neutral position thereof when said first rod moves during movement of said manually movable member of said brake means to engage the latter.

8. In a vehicle, in combination, a hydraulic torque converter; rotary output means driven by said hydraulic torque converter and operatively connected to said axle means for driving the latter, said output means being in permanent driving engagement with said axle means; brake means cooperating with said rotary output means for stopping the movement thereof when said brake means is engaged and for stopping the drive to said axle means when said brake means is engaged, said brake means including a manually movable member for actuating said brake means; a hydraulic conduit communicating with said hydraulic torque converter; valve means communicating with said conduit and movable between high and low pressure positions for maintaining fluid in the torque converter at relatively high and low pressures, respectively; a bell crank cooperating with said valve means for moving the same between said positions thereof upon turning of said bell crank; and an elongated rod supported for longitudinal movement and connected to said bell crank and said manually movable member of said brake means for turning said bell crank to place said valve means in said low pressure position thereof when said manually movable member is actuated to engage said brake means.

9. In a vehicle, in combination, a hydraulic torque converter; rotary output means driven by said hydraulic torque converter; brake means cooperating with said rotary output means for stopping the movement thereof when said brake means is engaged, said brake means includnig a manually movable member for actuating said brake means; a hydraulic conduit communicating with said hydraulic torque converter; valve means communicating with said conduit and movable between high and low pressure positions for maintaining fluid in the torque converter at relatively high and low pressures, respectively; a bell crank cooperating with said valve means for moving the same between said positions thereof upon turning of said bell crank; an elongated rod supported for longitudinal movement and connected to said bell crank and said manually movable member of said brake means for turning said bell crank to place said valve means in said low pressure position thereof when said manually movable member is actuated to engage said brake means; transmission means bypassing said torque converter for transmitting a drive from an engine of the vehicle to a power take-off shaft or the like; clutch means operatively connected to said transmission means for connecting the latter to the power take-off shaft when said clutch means is in an engaged position and for disconnecting said transmission means from the power take-off shaft when said clutch means is in a disengaged position; and means connecting said valve means to said clutch means for placing the latter in said disengaged position when said valve means is in said low pressure position thereof, whereby actuation of said manually movable member to engage said brake means also results in disengaging of said clutch means.

References Cited in the file of this patent
UNITED STATES PATENTS

| | | |
|---|---|---|
| 1,978,172 | Sinclair | Oct. 23, 1934 |
| 2,084,219 | Salerni | June 15, 1937 |
| 2,104,608 | Cox et al. | Jan. 4, 1938 |
| 2,138,426 | Nelson | Nov. 29, 1938 |
| 2,904,146 | Codlin | Sept. 15, 1959 |
| 2,945,382 | Ritter et al. | July 19, 1960 |
| 2,990,925 | Bernotas | July 4, 1961 |